TELEVISION PICKUP TUBE CIRCUIT ARRANGEMENTS

Filed March 1, 1955 2 Sheets-Sheet 1

INVENTOR.
ROBERT G. NEUHAUSER
BY
[signature]
ATTORNEY

TELEVISION PICKUP TUBE CIRCUIT ARRANGEMENTS

Filed March 1, 1955

INVENTOR.
ROBERT G. NEUHAUSER
BY
ATTORNEY

United States Patent Office 2,901,661

Patented Aug. 25, 1959

2,901,661

TELEVISION PICKUP TUBE CIRCUIT ARRANGEMENTS

Robert Groff Neuhauser, Lancaster, Pa., assignor to Radio Corporation of America, a corporation of Delaware Application March 1, 1955, Serial No. 491,481

12 Claims. (Cl. 315—11)

The invention relates to the development of television image signals and it particularly pertains to improvements in the linearity of image pickup systems.

This application is a continuation-in-part of the copending U.S. patent application Serial Number 389,056 of Robert G. Neuhauser, filed October 29, 1953, for Television Pickup Tubes, and thereafter abandoned.

Television camera tubes such as the image orthicon, the vidicon and the like low velocity scanning beam tubes develop signals in accordance with light impinging on a photosensitive electrode. The signals developed by such image pickup tubes are truly representative of the light focused on the photocathode, but the signals produced are subject to errors within conventional manufacturing tolerances, which errors are termed "shading" by the artisan. There are several principal types of shading. One type, termed "background" or "axis-shading" occurs when no light impinges on the photosensitive electrode of the pickup tube. This type of shading is more troublesome with the image orthicon wherein it is caused primarily by non-uniformity of the surface of the first dynode in the electron multiplier portion of the tube. Partial or incomplete incidence of the electron beam at the target, and non-uniform spacing between the target and screen electrodes, the combination of which constitutes the target assembly, produce shading or uniformity errors when light is focused on the tube. Another type of shading, termed "gain" or "modulation-shading," is caused primarily by the variations in sensitivity over the scanned area of the photocathode, which problem is more serious in the vidicon pickup tube.

Manufacturing tolerances and operating techniques have made the conventional tubes perfectly serviceable in the case of monochrome or black-and-white picture transmission, but the same tubes may give rise to erroneous color impressions in the case of polychrome or full color image transmission. Because a plurality of component color signals are required to produce a representative color signal, any error in the component colors resulting from tube parameter inaccuracies would produce a color signal not truly representative of the original scene.

An object of the invention is to provide improved means for television signal transmission.

Another object of the invention is to correct for the non-linearity of a television signal caused by the incomplete or partial incidence of an electron beam on the target electrode of the scanning device.

A further object of the invention is to improve the signal response by compensating for the non-uniform spacing of the television camera tube target assembly.

Still another object of the invention is to improve the television signal produced by the non-homogenous photosensitivity of the photocathode of the camera tube.

A still further object of the invention is to improve the focusing function of camera tubes for which other functions have been improved in accordance with the foregoing objects.

According to the invention means are provided for producing a corrected television signal by applying to the cathode of the signal producing tube a shading signal which is complementary to the signal produced by the electron beam at the point of impact on the target electrode. The instantaneous value of the beam-produced signal is compensated for shading by the instantaneous value of the shading signal which is complimentary to the signal which is produced by the electron beam impinging on the target electrode under given illumination, effectively producing a dynamic point-by-point compensation. This compensation effectively overcomes the distortion produced because of non-uniform incidence of the electron beam on the target electrode, because of the uneven spacing between the target and screen of the target assembly and because of any non-homogenous characteristics of the photocathode that may exist.

In the process of correcting for uneven sensitivity and the like of low velocity scanning beam tubes defocusing may occur, especially if the tube is of the vidicon type, due to the difference in transit time of the electrons through the magnetic field. This defocusing effect is corrected further according to the invention by applying a voltage to focusing electrodes of the tube that is proportional to the shading signal applied to the cathode electrode. In practice this correction may be readily accomplished according to the invention by connecting an amplifier, of controllable gain and output of the same polarity as the input, between the cathode and focusing electrodes.

Figure 1:
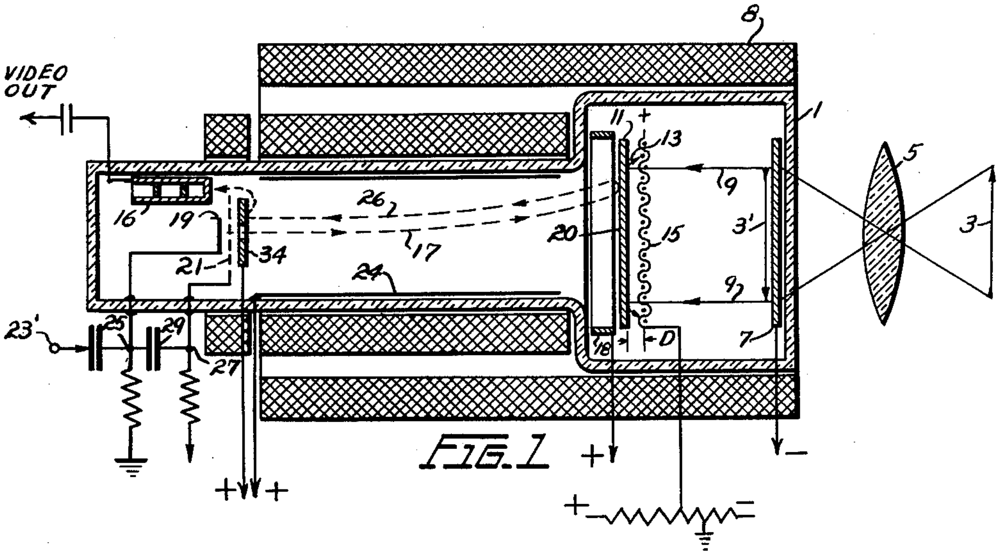
Fig. 1 shows schematically the manner in which the invention may be applied to an image orthicon tube.

Referring to Fig. 1 there is shown an image orthicon pickup tube 1 in which an image source 3 is imaged by photo-optical lens 5 onto a photocathode 7 of the image orthicon tube 1. Whenever light impinges upon the photocathode 7, photoelectrons are released in direct proportion to the intensity of light falling upon the photocathode 7. The photoelectrons are accelerated from the photocathode 7 by a uniform electric field produced by applying appropriate potentials between photocathode 7 and another electrode termed a target 11. The electron charge image is focused on the target 11 by a uniform magnetic field produced by a coil 8. This field is parallel to the axis of the tube. The paths 9 of the photoelectrons extending from the photocathode 7 to the target 11 are, except for emission velocities, substantially straight lines parallel to the axis of the image tube. The electron image at the target 11 has nearly unity magnification. The photoelectrons strike the target 11 at a potential at which the secondary emission ratio is greater than unity. Because of the fact that more secondary electrons are emitted than there are incident photoelectrons, a positive charge pattern is formed on the target 11 in which the more positive areas correspond to the highlights of the image.

The secondary electrons follow a path 13 and are collected by a fine mesh screen 15 to which has been applied some definite fixed positive potential. While the charge pattern is being laid down on the image side of the target 11, an electron beam 17 is scanning the target 11 on the side 20 nearest the scanning beam 17.

The electron beam 17 is a low velocity electron beam derived from an electron gun and accelerated by some fixed potential applied between the cathode electrode 19 and an accelerating electrode 34 and is made to traverse a path parallel to the axis of the tube by the uniform magnetic focusing field produced by the flow of current in the coil 8. A wall electrode 24, also called a focusing electrode, is maintained at a fixed positive potential the value of which aids in determining the focus of the electron beam. As the electron beam approaches the target 11, it is slowed down or accelerated to approximately zero volts by a decelerating ring 18. Since the beam is at cathode potential and the cathode 19 is normally operated at zero potential, the beam, striking the target 11, drives the target to cathode potential or zero potential. Effectively, what happens at the target is that the photoelectrons striking a given element of the target dislodge electrons so that at the point of impact there exists a positive charge whose potential depends upon the number of electrons dislodged. Since the conventional target 11 is very thin, the excess positive charge on the image side of the target 11 is transferred capacitively to the scanning side so that the positive charge exits on both sides of the target 11 at any given point. As the scanning beam 17 impinges on the target 11, sufficient electrons from the beam 17 are deposited at the point of impact to neutralize the positive charge existing there, thereby reducing the potential of the target 11 to zero potential at the point of impact. At the same time the return beam 26 having fewer electrons is effectively intensity modulated in accordance with the charge distribution at the target 11. This return beam 26 in turn strikes an electrode element 34, which serves the dual function of an accelerating electrode and a multiplier dynode thereby dislodging secondary electrons, the number of electrons released being in direct proportion to the intensity modulation of the return electron beam 26. By means of an electron multiplier 16 the signal is amplified.

The target assembly screen 15, as previously stated, has a fixed positive potential so that the electrons released by the target 11 as a direct result of the photoelectric bombardment will be attracted to the screen 15. The total signal swing of the voltage of an element on the target 11 capable of being produced is limited by the difference in potential between the screen 15 and the target 11. If the target 11 were to reach a potential equal to that of the screen 15, there would be no attraction of secondary electrons so that effectively the secondary electrons would return to the beam on the target 11. It is important to insure a uniform signal output at all points on the target 11. In order that this may be accomplished it is necessary to have the potential limits constant over the target 11.

The upper potential limit as set by the fine mesh screen 15 is the same at all points on the target 11. The lower potential limit, however, is set by the lowest potential to which the beam 17 can charge the target 11. If the beam reached the target at all points with normal, that is complete, incidence the lower potential limit would be constant over the target and equal to zero volts. However, because of any abnormal, and therefore incomplete, incidence of the electron beam 17 at the target 11, the condition whereby the lower potential limit would be constant over the target and equal to zero volts is not readily attainable. One way in which incomplete beam incidence may occur will be described. When the beam enters the magnetic field from the electron gun, the direction in which the beam is initially projected may not be quite parallel to the magnetic lines of force produced by the magnetic field. Due to a component of the beam velocity transverse to the magnetic field lines helical motion of the beam is produced. The energy which gives rise to this helical motion subtracts from the initial energy of the beam by which it is directed along the magnetic lines. Since it is the remaining beam energy producing this latter motion which determines the potential to which the beam 17 can charge the target 11, the loss in energy by the helical motion will prevent the beam from reducing the target to zero potential. In effect, the longitudinal velocity of the beam is so reduced by such an energy loss that not all of the electrons of the beam reach the target thereby resulting in incomplete beam incidence, and non-uniformity of voltage over the scanned side of the target 11.

Other factors may give rise to this helical motion in the electron beam. For example, the electron beam while undergoing the process of negotiating a bend in the magnetic field lines due to the effect of the deflection field, redistributes some of the initial energy into helical motion. This means that that the amount of energy actually increases for larger angle of deflection, weaker magnetic fields, and higher beam voltages. The helical energy actually increases from the center of the picture out to the edges, representing a corresponding loss in signal due to uneven voltages being applied across the storage capacitance component of the target assembly.

In accordance with the invention the image orthicon and a modified circuit is employed for compensating for the departure from normal, or complete, incidence of the electron beam 17. As the beam 17 intercepts the target 11 at some given element with an abnormal, or incomplete, incidence, the target 11 normally would not be driven to zero potential because of the energy used in importing the helical motion to the beam. Although the cathode 19 is normally at zero potential, the target 11 as a result of this incomplete beam incidence will assume a potential slightly positive with respect to the cathode 19. To compensate for this the cathode is driven to some negative potential by a suitably shaped wave derived from a complex wave generator and applied at the terminal 23'. This complex wave generator may be similar to those disclosed in U.S. Patent 2,166,712, granted to A. V. Bedford July 18, 1939, and U.S. Patent 2,271,876, granted to S. W. Seeley on February 3, 1942, or to that disclosed hereinafter in connection with another embodiment of the invention. By this means the electron beam can overcome the loss of energy due to helical motion and drive the target at the point of impact to the desired potential and effectively compensate for the incomplete incidence of the beam 17. In applying the compensating wave to the cathode 19 of the image orthicon tube 1, it is necessary to apply the same correcting waveform to the beam intensity controlling electrode or grid 21 in order that the electron beam 17 will not be intensity modulated. The output of the complex wave generator is applied at the terminal 23' to the cathode 19 and the intensity controlling electrode 21 simultaneously by joining both the terminals 25 and 27 by a capacitor 29. In this manner both the intensity electrode 21 and the cathode 19 follow the compensating signal at all times while the potential difference between these electrodes is held constant.

Figure 2:
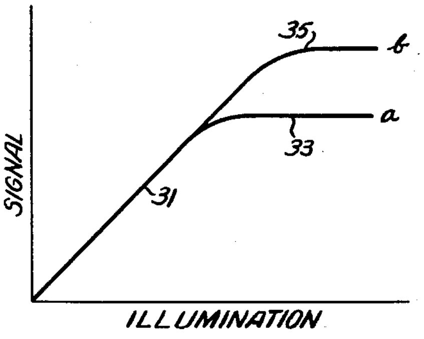
Fig. 2 shows graphically the signal-to-light characteristic of an image orthicon having different target-to-screen spacing.

A pair of response curves of a typical image orthicon pickup tube is shown in Fig. 2. The characteristic curves represent the signal output against the illumination giving rise to that signal output. Curves *a* and *b* represent the response for different screen-to-target spacing D of Fig. 1. Both curves indicate that in the common portions 31, the signal varies directly with illumination. In the portions 33 of curve *a* and 35 of curve *b* the signal output remains relatively constant with increasing illumination. The rising characteristic of the common portions may be explained by the theory that in the operating region represented by the common portion 31 of the curve the signal output is proportional to the image charge on the target 11. Since the maximum amount of charge that can be deposited on an element of the target depends on the capacitance of the element and the potential of the screen 15 above the potential of the scanned side 20 of the target, the potential of the target never reaches the screen potential at low light levels. However, as the target potential approaches or exceeds the screen potential, the secondary electrons instead of following a path which terminates in the screen 15, follow a path leading back to the target 11 thereby resulting in no increase in signal as the light input increases. The signals represented by the portions 31 and 33 of curve *a* are determined by the charge accumulated by a picture element just prior to being scanned by the electron beam. The portion 33 represents this charge as equal to the total charge that the entire target considered as a parallel plate condenser can acscumulate divided by the number of picture elements.

Curve *b* of Fig. 2 shows the characteristic curve whereby the target-to-screen spacing is less than for that case represented by the curve *a*. If the spacing D were uniform over the complete surface of the target and the screen area, the graphical representative would result in a curve similar to *a*, or *b* depending upon the specific variation of the spacing D. For optimum conditions this distance should be uniform, but as a practical matter, this is seldom the case. Because there is sometimes a variation in this target-to-screen spacing, the signal will not follow any one of the representative curves in Fig. 2 but may produce a signal having a response represented by a curve similar in shape and usually intermediate to the curves shown. This, therefore, represents a signal whose output will not be uniform or representative of a light giving rise to such signal. Again by applying a complex wave to the cathode 19, the signal variation produced by the nonuniform target-to-screen spacing will be corrected to give an output signal most truly representative of the light image giving rise to such signal.

Figure 3:
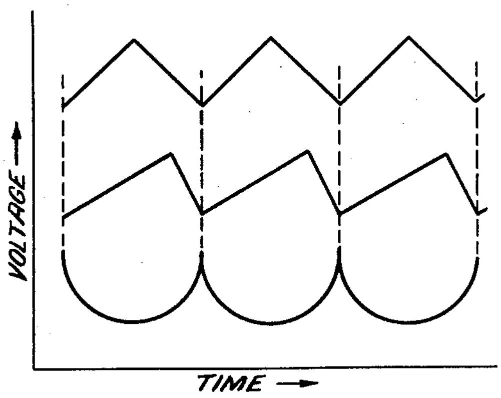
Fig. 3 is a graphical representation of waveform which may be used in the practice of the invention.

Fig. 3 represents examples of various complex waveforms which may be used to produce the desired compensating effect. Such signals may be applied singly or in combination in the polarity shown or effectively in opposite polarity to produce the proper compensation necessary to overcome the objections previously described.

Figure 4:
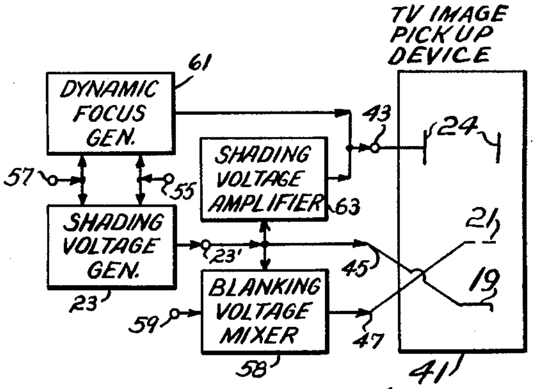
Fig. 4 is a functional diagram of an embodiment of the invention.

In the process of correcting for non-uniform light-sensitivity of the image pickup tube there may be some defocusing of the electron beam. This defocusing action may be overcome by further circuitry according to the invention. Referring to Fig. 4 there is shown a functional diagram of a circuit arrangement for compensating for the defocusing action as well as for performing the function described above in connection with the generation of complex shading voltage waves for the image orthicon pickup tube. An image pickup device 41 having at least three inner electrodes brought out to terminals 43, 45 and 47 is provided with shading voltage obtained at the output terminals 23' of a complex wave generator or shading voltage generating circuit 23 which operates in response to applied horizontal synchronizing pulses at input terminals 55 and applied vertical synchronizing pulses at input terminals 57.

In comparsion to Fig. 1, the terminal 45 of Fig. 4 corresponds to the cathode electrode terminal 25 of Fig. 1 which in that figure was connected to the cathode 19 and to the terminal 23' by means of a capacitor. In the arrangement shown in Fig. 1, a capacitor 29 was used to couple the cathode terminal 25 to the beam intensity controlling grid terminal 27 and if desired in the arrangement of Fig. 4 a similar capacitor can be used to couple the terminal 45 to the terminal 47 which is connected to the beam intensity controlling electrode of the image pickup device 41. Further according to the invention, however, it is contemplated that a blanking voltage mixing circuit 58 may be used whereby the desired coupling is accomplished and blanking voltage, applied at the blanking input terminals 59, may also be impressed on the intensity controlling electrode of the image pickup device 41.

The image orthicon, the vidicon and some other television image pickup tubes are devices in which a low velocity electron beam approaches the surface of the target at substantially zero energy and perpendicularly thereto. Such approach is advantageous in that it eliminates the extraneous signals which would be caused by secondary electron emission resulting from primary electrons striking the target surface with high velocity. In these types of image pickup tubes, however, there is a loss of beam focus as the beam is moved from the center towards the edges of the target. This loss of focus is due to the change in length of the path of the electron beam as the beam is deflected from the center of the target by the magnetic deflecting fields. Due to this loss of beam focus there is a loss in resolution of the reproduced image. Optimum focus of the beam over all portions of the target is provided for by applying a dynamic focusing voltage wave obtained from a dynamic focus wave generating circuit 61 to one or more focusing electrodes at the terminals 43 of the image pickup device 41. Circuitry for producing such dynamic focusing is known although improved circuitry therefore will be described hereinafter in the description of the schematic diagram of Fig. 5.

If the magnitude of the necessary correcting voltage impressed on the cathode electrode to achieve point-by-point voltage control assuring uniformity of the desired output signal is in excess of two or three volts on the conventional low velocity scanning beam tubes, the resulting change in velocity of electron beam through the path between the cathode and the signal electrode will be altered sufficiently to defocus the beam due to the difference in transit time through the magnetic focusing field. To compensate for this defocusing action, a shading voltage amplifying circuit 63 is connected between the terminal 45, which is internally connected, usually to the cathode but at least, to some electrode of the electron gun of the image pickup device and the terminal 43 which is usually connected to the focusing electrode of the pickup device 41. The shading voltage amplifying circuit 63 amplifies the voltage applied to the cathode electrode for shading correction and applies it in the correct amplitude and polarity with a focusing circuitry of the image pickup device to compensate for any defocusing action. The dynamic focus voltage wave from the generator 61 and the shading voltage output of the shading voltage amplifier 63 usually may be directly added to the focus electrode of a focusing image pickup device although it should be understood that according to the invention a mixing circuit might be interposed at this point, if desired.

Referring to the image orthicon 1 shown in Fig. 1 the dynamic focus wave from a dynamic focus wave generating circuit 61 shown in Fig. 4 and the amplified shading voltage obtained from the amplifier 63 would be applied preferably to the focusing electrode 24, frequently termed the "oth focus" electrode.

The vidicon is an orthicon camera tube very similar in construction to the image orthicon tube insofar as the portions to which the circuitry according to the invention are to be applied. This tube is susceptible to partial incidence errors and this trouble is corrected according to the invention in exactly the same way as to the image orthicon. The vidicon differs mainly in that the photosensitive electrode is photo-conductive rather than photoemissive as are the targets for the image orthicon and other iconescope tubes. Because of the similarity, the schematic symbol of the vidicon is shown at 41' in Fig. 5 and the focusing coil deflection winding and alignment coils are omitted in the interest of clarity. Mounted within the envelope 42 of the vidicon 41' is an electron gun consisting of a cathode electrode 66 a first grid or beam intensity controlling electrode 68, a second grid or accelerating electrode 69, a third grid or focusing electrode 72 and a fourth grid or "orth" focusing electrode 74 having a fine mesh screen electrode 76 at the end thereof remote from the cathode electrode 66. Frequently the focus electrodes 72 and 74 are referred to as wall electrodes since in many conventional models of image orthicons and vidicons these electrodes comprise conductive coatings on the interior walls of the glass envelopes of the tubes. In the vidicon tube there is a light transparent conducting film forming the signal output electrode 78, which electrode is often a film of material such as tin oxide deposited on the inner surface of the glass envelope. A second deposit of photo-conductive material, such as selenium or antimony tri-sulphide, is deposited on the inner surface of the output electrode 78 to form the photoconductive target 79. The output electrode 78 is maintained at 10 to 80 volts positive potential by means of a potentiometer 81 connected across a source of positive potential and the video signals developed across a load resistor 82 are obtained by means of a capacitor 83 coupled to the video signal output terminal 84. The sensitivity of the vidicon is proportional to the voltage across the photo-conductive material which is also the storage element. This voltage is the cathode-to-signal electrode voltage. Where the sensitivity is not uniform from point-to-point over the scanned area of the photo-conductor, the potential across this material is varied point-by-point according to the invention by applying a corrective or shading voltage wave to the cathode electrode to charge the actual point-to-point potential to provide uniform photosensitivity over the raster. Since the signal electrode potential must be fixed, it is the cathode potential that is varied. Otherwise the structure and function of the portions to which the invention applies, however, is very much the same as that of the image orthicon and like television image pickup tubes.

Figure 5:
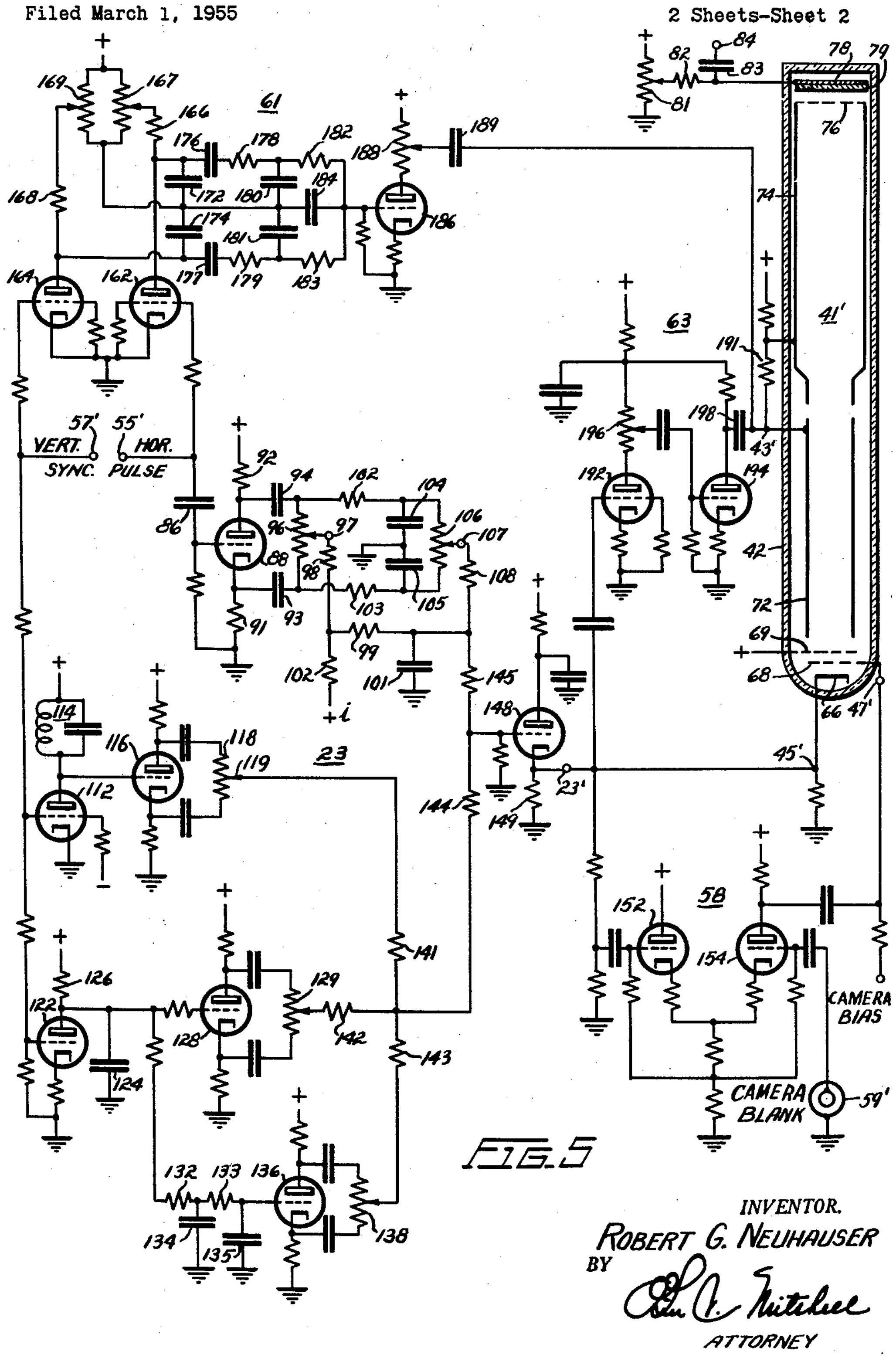
Fig. 5 is a schematic diagram of another embodiment according to the invention especially suitable for use with a vidicon tube.

Shading voltage waves may be generated by the circuitry shown in the above mentioned U.S. Patents 2,116,712 and 2,271,876. Alternatively, an effective single tube circuit is shown in Fig. 5 for deriving horizontal shading voltage waves having either sawtooth or parabolic curve portions or both. Horizontal synchronizing pulses applied by way of a coupling capacitor 86 to the grid of a triode vacuum tube 88 connected in the known paraphase repeater or amplifier circuit. Erect and inverted repetitions of the input pulse train appear across cathode and anode resistors 91, 92, which are preferably equal in value. By means of output coupling capacitors 93, 94 voltages of opposite polarity but of equal amplitude in respect to a point of fixed reference potential, shown here as ground, are obtained. The amplitude and polarity of the desired pulses are obtained by means of a potentiometer 96 connected to the coupling capacitor 93, 94. If the arm 97 of the potentiometer 96 at the electrical center, zero shading voltage will be derived. Alternatively this electrical center could be connected to the point of fixed reference potential or ground, but this is considered unnecessary. As the arm 97 is moved closer to the cathode connection a train of pulses of positive going potential and increasing amplitude will be obtained, and as the arm 97 is swung in the other direction a train of pulses of opposite polarity and increasing amplitude will be obtained. The derived pulses are applied through resistive element 98, 99 to an integrating capacitor 101 across which there is formed a voltage of sawtooth waveform. A resistor 102 is used to reduce the amplitude of the sawtooth horizontal shading voltage wave to approximately the same as the parabolic shading component to make the adjustment of the arms 97, 107 easier in practice. By means of resistors 102, 103 and capacitors 104, 105 and another potentiometer 106 having an arm 107 positive or negative going serrated waves having curved portions approximating a parabola are derived and added by way of a resistor 108 to the sawtooth waveform across the integrating capacitor 101. By differentially varying the arms 97 and 107 on the potentiometers 96 and 106 respectively almost any shading voltage required for use with conventional vidicons or image orthicons can be obtained.

The arrangement shown for generating horizontal shading voltage waves may be adapted to generate shading voltage waves at vertical rate, if desired. Alternatively the correcting waveform can be generated and different polarity waves obtained by using a paraphase repeater or amplifier as shown by the sine wave generating tube 112 having a tuned circuit 114 connected to the anode which circuit is resonant to the vertical synchronizing repetition rate of the pulses applied to the input terminals 57′. A sine wave of vertical synchronizing pulse frequency is obtained at the anode of the generating tube 112 and applied to the grid of a paraphase repeater tube 116 from which sine waves or negative polarity are derived by means of a potentiometer 118 having an arm 119 comparable in the same manner as the arm of the potentiometer of the horizontal shading voltage generating circuit described above. It should be noted that if sine wave variations are desired in the horizontal shading voltage wave a similar circuit responsive to horizontal synchronizing pulses can be used to add a sine wave component across the integrating capacitor 101, if desired. A sawtooth shading voltage wave is obtained at the vertical frequency by means of a sawtooth generating circuit comprising an integrating capacitor 124 discharged and the anode load resistor 126 of the tube 122 which serves to discharge the capacitor 124 in response to the vertical pulses applied at the terminals 57′. The sawtooth wave is then applied to a first paraphase amplifier tube 128 having a potentiometer 129 arranged to provide sawtooth wave of either polarity and of the desired amplitude for adding to a sawtooth wave having parabolic curve portion generated by means of a further integrating circuit comprising resistors 132, 133 and capacitors 134, 135. Generated waves of desired polarity and amplitude, obtained by means of a paraphase amplifier tube 136 and potentiometer 138, are used to determine the polarity and amplitude of the curved shading signal as desired. Vertical shading voltage wave components are combined by adding through resistors 141, 142 and 143 as shown or by means of more complex mixing circuitry using vacuum tubes if desired. The vertical and horizontal shading voltage waves are preferably combined by means of isolated resistors 144, 145 or other mixing circuitry and applied to an amplifier tube 148. Low impedance of the combined shading voltage wave is obtained across the cathode resistor 149 and applied to the correcting voltage wave terminals 23′ from which it is applied at the terminal 45′ to the cathode 66 of the vidicon 41′. This dynamic control will provide an output signal at the terminal 84 which is correct for shading but the electron beam would be intensity modulated by the shading voltage wave except for the fact that the signal grid electrode 68 of the vidicon 41′ is made to rise and fall with the cathode electrode 66 either by capacitive connection between the terminal 45′ and 47′ and as described hereinbefore in connection with the embodiment of the invention illustrated by the application to the vidicon tube shown in Fig. 1, or as shown in Fig. 5 through the intermediary of a pair of cathode coupled tubes 152 and 154. Since the image signal pickup tube beam must be blanked the tubes 152 and 154 are also used as a blanking voltage mixing circuit to impress the camera blanking wave applied at the blanking input terminals 59′ on the signal grid 68 of the vidicon 41′ to cut the electron beam of the vidicon tube 41′ off during the blanking interval.

The preferred arrangement for generating a dynamic focusing voltage wave is generator 61 shown in Fig. 5. The horizontal synchronizing pulses appearing at terminals 55′ are applied to an amplifier or repeater tube 162 and vertical synchronizing pulses appearing at the input terminals 57′ are applied to another amplifier or repeater tube 164. The pulses are repeated across a load resistor 166 and part of a potentiometer 167 and across a load resistor 168 and part of another potentiometer 169 respectively. The potentiometers serve to vary the amplitude of the repeated pulses and the current flowing through these resistance circuits charge a pair of integrating capacitors 172, 174 respectively, the tubes 162, 164 forming the discharge circuits therefor so that sawtooth waves of desired amplitude are developed across the two capacitors 172, 174. Coupling capacitors 176, 177 connect the sawtooth charging capacitors 172, 174 respectively to integrating circuitry comprising series resistors 178, 179 and shunt capacitors 180, 181. Further resistors 182, 183 and a single capacitor 184 complete the integrating circuitry. In effect two integrating circuits are establishing with the capacitor 184 common to both integrating circuits. No mixing tube is necessary when using the novel integrating circuitry having this common capacitor 184. The common capacitor acts to mix the two serrated waveforms generated by the remainder of the integrating networks and a mixing tube is thereby obviated. A parabolic wave appears across the capacitor 184 and this wave is amplified by an amplifying tube 186 which produced the parabolic wave across the resistance element of a potentiometer 188 in the anode circuit. The amplitude of the parabolic wave to be used is determined by movement of the arm on the potentiometer 188. By means of a coupling capacitor 189 the parabolic wave is applied at the terminals 43′ to the focusing electrode 72 of the vidicon 41′ and by means of a resistor 191 a parabolic wave of lower amplitude is also applied to the "orth" focusing electrode 74.

If the magnitude of the shading voltage wave applied to the cathode 66 is in excess of two or three volts, the resulting change in velocity of electron beam through the path of the cathode 66 and the output signal electrode 78 will cause a defocusing action due to the difference in transit times through the magnetic focusing field. To compensate for this additional defocusing action an amplifier 63 is connected to the cathode at the terminal 45′ and between the focusing electrode 72 at the terminal 43. The amplifier 63 comprises two cascade coupled electron discharge tubes 192, 194. The gain of the amplifier is controlled by the position of an arm on a potentiometer 196 in the anode circuit of the first tube 192. Amplifier 63 should have a gain on the order of ten and an output of the same polarity as the input for use with the conventional vidicon tubes. Obviously any other type of amplifier meeting these requirements will be perfectly satisfactory. The dynamic focusing potential obtained from the dynamic focusing generating circuit 61 and the amplified correction voltage obtained from the amplifier 63 are superimposed upon the focusing electrode 72 of the vidicon tube 41′.

Similar structure is readily adaptable for use with an image orthicon tube such as shown in Fig. 1 or similar orthicon tubes.

It should be understood that the apparatus described in the foregoing specification functions to maintain the intensity of the electron beams substantially constant and varies only the potential relationship between the cathode electrode and the various other electrodes of the image pickup tube.

The circuit arrangement according to the invention is particularly important in color image signal pickup tube application where the component color signals produced by the plurality of pickup tubes must match point-by-point over the scanned area of the target to avoid color shading or mis-match. With the image orthicon tubes, it is the background shading that is most troublesome so that color signals are not nearly so much affected by non-uniformity between tubes although it is necessary that the sensitivity of the photosensitive electrodes match point-by-point over the scanned area as is accomplished with the circuitry of the invention by producing a desired potential across the storage element constituted by the target electrode and the screen electrode forming the target structure or assembly by controlling the cathode or the electron gun potential. With the vidicon tubes, which have photoconductive storage elements or target structures or, target assemblies, the sensitivity to impinging light is proportional to the voltage developed across the storage element or photoconductor. If the target material is not entirely uniform, the non-uniformity will be reflected in the signal. This will be even worse when considering the plurality of tubes in a color television camera unless steps are taken according to the invention effectively to match the sensitivity of the tubes point-by-point over the scanned area by varying the potential on the cathode or the electron gun.

The invention claimed is:

1. In a television system, the combination including a pickup tube comprising a target electrode adapted to have a charge image formed thereon corresponding to an optical image of an object, and means including an electron gun for producing an electron beam, said electron gun having a cathode and an intensity control electrode, means for angularly deflecting said beam for scanning said target electrode to develop signals representative of said charge image, said signals being subject to shading distortion, and means for varying the potential of the cathode and control electrode of said electron gun relative to the potential of said target electrode as a function of the beam deflection angle to compensate for said shading distortion of said signals.

2. In a television system, the combination including a pickup tube comprising a target electrode adapted to have a charge image formed thereon corresponding to an optical image of an object, and means including an electron gun for producing an electron beam, means for angularly deflecting said beam for scanning said target electrode to develop signals representative of said charge image and at least one focusing electrode interposed between said electron gun and said target electrode, said signals being subject to shading distortion, means for varying the potential of the cathode of said electron gun relative to the potential of said target electrode as a function of the beam deflection angle to compensate for any shading distortion of said signals, and means for varying the potential of said focusing electrode as a function of beam deflection angle to compensate for defocusing effect due to said variation of electron gun potential.

3. In a television system, the combination including a pickup tube comprising a target electrode adapted to have a charge image formed thereon corresponding to an optical image of an object, an electron gun for producing an electron beam, said electron gun having a cathode electrode and an intensity control electrode and a focusing electrode interposed between said intensity control electrode and said target electrode, means for angularly deflecting said beam for scanning said target electrode to develop signals representative of said charge image, said signals being subject to shading distortion, means for varying the potential of the cathode and grid of said electron gun relative to the potential of said target electrode as a function of the beam deflection angle to compensate for any shading distortion of said signals without varying the intensity of said electron beam, and means for varying the potential of said focusing electrode to compensate for defocusing effect due to said variation of cathode and intensity control electrode potential.

4. In a television system, the combination including a pickup tube comprising a target assembly having a target and screen electrode adapted to have a charge image formed thereon corresponding to an optical image of an object and means including an electron gun for producing an electron beam, said electron gun having a cathode electrode and an intensity control electrode, means for angularly deflecting said beam for scanning said target electrode to develop signals representative of said charge image, means for normally maintaining the cathode of said electron gun and said target electrode at substantially the same potential whereby normally said beam is incident upon said target electrode, said signals being subject to distortion produced because of non-uniform incidence of the electron beam on the target electrode, because of uneven spacing between the target and screen of the target assembly and because of any non-homogeneous characteristics of the photo cathode, and means including a complex wave generator connected to said cathode electrode and connections between said cathode and said intensity control electrodes for varying the potential of the cathode and intensity control electrodes of said electron gun relative to the potential of said target electrode as a function of the beam deflection angle to compensate for said shading distortion and any incomplete incidence of said beam upon said target electrode.

5. In a television system, a combination as defined in claim 4 and wherein said connections include a pair of electron discharge systems having intercoupled cathode electrodes, control and anode electrodes individually connected to points of direct energizing potential, the control electrode of one of said electron discharge systems being coupled to the cathode electrode of said pickup tube and the anode electrode of the other of said electron discharge systems being coupled to the intensity control electrode of said pickup tube, and means to apply modulating potentials to the control electrode of said other electron discharge system.

6. In a television system, a television image pickup device having at least cathode, intensity controlling, and target electrodes, means for angularly deflecting the electron beam emanating from said cathode electrode to scan the said target electrode, means normally maintaining said target and said cathode electrodes at substantially the same potential, a complex wave generator coupled to said cathode electrode for varying the potential of said cathode and with respect to the target potential as a function of deflection angle, and connections between said cathode and intensity controlling electrodes for maintaining the instantaneous potential relationship therebetween substantially constant.

7. In a television system, a television image pickup device having at least cathode, intensity controlling, focusing and target electrodes, means for angularly deflecting the electron beam emanating from said cathode electrode to scan said target electrode, means normally maintaining said target and said cathode electrodes at substantially the same potential, a complex wave generator coupled to said cathode electrode for varying the potential of said cathode and with respect to the target potential as a function of deflection angle, connections between said cathode and intensity controlling electrodes for maintaining the instantaneous potential relationship therebetween substantially constant, and an amplifier connected between said cathode and said focusing electrodes to compensate for any defocusing due to said variation in cathode and intensity controlling electrode potential.

8. In a television system, a television image pickup device having at least cathode, intensity controlling, focusing and target electrodes, means for angularly deflecting the electron beam emanating from said cathode electrode to scan said target electrode, means normally maintaining said target and said cathode electrodes at substantially the same potential, a complex wave generator coupled to said cathode electrode for varying the potential of said cathode and with respect to the target potential as a function of deflection angle, connections between said cathode and intensity controlling electrodes for maintaining the instantaneous potential relationship therebetween substantially constant, a dynamic focus wave generator connected to said focusing electrode for varying the potential on said focusing electrode normally as a function of the angular deflection to compensate for the difference in electron path length between said target and cathode electrodes as said electron beam is scanned over said target electrode, and an amplifier connected between said cathode and said focusing electrodes to compensate for any defocusing due to said variations in cathode and intensity controlling electrode potential.

9. In a television system, the combination including a pickup tube comprising a photo-conductive target adapted to have a charge image formed thereon corresponding to an optical image of an object and means including an electron gun for producing an electron beam, wherein said photo-conductive target is of non-uniform conductivity over the scanned area, means for angularly deflecting said beam for scanning said target electrode to develop signals representative of said charge image, means for normally maintaining the cathode of said electron gun and said target electrode at substantially the same potential whereby normally said signals reflect said non-uniformity of said photo-conductive target, and means for varying the potential of the cathode of said electron gun relative to the potential of said target to compensate for said non-uniform conductivity point-by-point over the scanned area of said target.

10. In a television system, the combination including a pickup tube having an electron gun producing a low velocity electron beam scanning a target of the type wherein the sensitivity to light impinging thereon is proportional to the voltage across the target which is arranged to have a charge image formed thereon corresponding to an optical image of an object, said electron gun having a cathode, means for angularly deflecting said beam for scanning said target to develop signals representative of said charge image, means for normally maintaining the cathode of said electron gun and said target at substantially the same potential and means for varying the potential of the cathode of said electron gun relative to the potential of said target as a function of the beam deflection angle to compensate for any non-uniformity of said target.

11. In a television system, a television image pickup device having at least cathode, intensity controlling electrodes and a photo-conductive target structure, means for angularly deflecting the electron beam emanating from said cathode electrode to scan said target structure, means normally maintaining said target structure and said cathode electrode at substantially the same potential, a complex wave generator coupled to said cathode electrode for varying the potential of said cathode with respect to the target potential as a function of deflection angle, and connections between said cathode and intensity controlling electrodes for maintaining instantaneous potential relationship therebetween substantially constant.

12. In a television system, a television image pickup device having at least cathode and intensity controlling electrodes and a target structure constituting a storage element the voltage across which is an index of the sensitivity of the device to the light impinging thereon, means for angularly deflecting the electron beam emanating from said cathode electrode to scan said target structure, means normally maintaining said target structure and said cathode electrode at substantially the same potential, a complex wave generator coupled to said cathode electrode for varying the potential of said cathode and with respect to the target potential as a function of deflection angle, and connections between said cathode and intensity controlling electrodes for maintaining the instantaneous potential relationship therebetween substantially constant.

References Cited in the file of this patent

UNITED STATES PATENTS

| | | |
|---|---|---|
| 2,213,179 | Iams | Aug. 27, 1940 |
| 2,251,973 | Beale et al. | Aug. 12, 1941 |
| 2,463,553 | Olesen | Mar. 8, 1949 |
| 2,545,982 | Weimer | Mar. 20, 1951 |
| 2,654,048 | McGee et al. | Sept. 29, 1953 |